(12) United States Patent
Leclerc et al.

(10) Patent No.: US 12,492,124 B2
(45) Date of Patent: Dec. 9, 2025

(54) PROCESS AND DEVICE FOR MEMBRANE SEPARATION OF A MIXTURE CONTAINING HYDROGEN AND CARBON DIOXIDE AS MAIN COMPONENTS

(71) Applicant: L'Air Liquide Société Anonyme pour l'Etude et l'Exploitation des Procédés Georges Claude, Paris (FR)

(72) Inventors: Mathieu Leclerc, Paris (FR); Felix Pere, Paris (FR)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 550 days.

(21) Appl. No.: 17/873,766

(22) Filed: Jul. 26, 2022

(65) Prior Publication Data

US 2023/0027743 A1    Jan. 26, 2023

(30) Foreign Application Priority Data

Jul. 26, 2021   (FR) ..................... 2108056

(51) Int. Cl.
*C01B 3/50*      (2006.01)
*B01D 53/047*    (2006.01)
(Continued)

(52) U.S. Cl.
CPC ............ *C01B 3/503* (2013.01); *B01D 53/047* (2013.01); *B01D 53/226* (2013.01);
(Continued)

(58) Field of Classification Search
CPC ...... C01B 2210/001; C01B 2210/0051; C01B 3/501; B01D 2256/16; B01D 2256/22;
(Continued)

(56) References Cited

U.S. PATENT DOCUMENTS 6,301,927 B1   10/2001   Reddy
2009/0298957 A1   12/2009   Gauthier et al.
(Continued)

FOREIGN PATENT DOCUMENTS

CA    2940331 A1 *   3/2017   .......... B01D 53/229
EP    2 023 066       2/2009
(Continued)

OTHER PUBLICATIONS

French Search Report for corresponding FR 2108056, Apr. 26, 2022.
(Continued)

*Primary Examiner* — Magali P Slawski
*Assistant Examiner* — Rachel Marie Slaugovsky
(74) *Attorney, Agent, or Firm* — Elwood L. Haynes

(57) ABSTRACT

A process for membrane separation of a mixture containing as main, or even major, components hydrogen and carbon dioxide and also at least one other component, for example chosen from the following group: carbon monoxide, methane and nitrogen, including: heating of the mixture in the heat exchanger, permeation of the reheated mixture in a first membrane separation unit making it possible to obtain a first permeate which is a hydrogen and carbon dioxide enriched relative to the mixture, and a first residue which is hydrogen and carbon dioxide lean, permeation of the first residue in a second membrane separation unit making it possible to obtain a second residue, at least one portion of the first permeate is compressed in a booster compressor and the second residue is expanded in a turbine, the booster compressor being driven by the turbine.

12 Claims, 1 Drawing Sheet

(51) Int. Cl.
   *B01D 53/22* (2006.01)
   *C01B 3/34* (2006.01)
(52) U.S. Cl.
   CPC .............. *B01D 53/229* (2013.01); *C01B 3/34* (2013.01); *B01D 2256/16* (2013.01); *B01D 2257/504* (2013.01); *C01B 2203/0405* (2013.01); *C01B 2203/043* (2013.01); *C01B 2203/046* (2013.01); *C01B 2203/0475* (2013.01)
(58) Field of Classification Search
   CPC ...... B01D 2257/504; B01D 2311/1032; B01D 2317/02
   See application file for complete search history.

(56) References Cited

U.S. PATENT DOCUMENTS

| | | |
|---|---|---|
| 2011/0138852 A1 | 6/2011 | Hasse et al. |
| 2012/0241678 A1 | 9/2012 | Valentin et al. |
| 2019/0118134 A1 | 4/2019 | Granados et al. |
| 2020/0307997 A1* | 10/2020 | Tranier ............... C01B 3/56 |

FOREIGN PATENT DOCUMENTS

| | | | |
|---|---|---|---|
| FR | 2 877 939 A1 | 5/2006 | |
| FR | 2 953 505 | 6/2011 | |
| FR | 3 052 684 A1 | 12/2017 | |
| FR | 3 073 835 | 5/2019 | |
| WO | WO 2012 064938 | 5/2012 | |
| WO | WO 2012 064941 | 5/2012 | |
| WO | WO 2012 158673 | 11/2012 | |
| WO | WO-2013131916 A1 * | 9/2013 | ............ C01B 3/384 |

OTHER PUBLICATIONS

International Search Report for related PCT/EP2024/050439, Jun. 18, 2024.

* cited by examiner

PROCESS AND DEVICE FOR MEMBRANE SEPARATION OF A MIXTURE CONTAINING HYDROGEN AND CARBON DIOXIDE AS MAIN COMPONENTS

CROSS REFERENCE TO RELATED APPLICATIONS

This application claims the benefit of priority under 35 U.S.C. § 119(a) and (b) to French Patent Application No. 2108056, filed Jul. 26, 2021, the entire contents of which are incorporated herein by reference.

BACKGROUND

The present invention relates to a process and to a device for membrane separation of a mixture containing hydrogen and carbon dioxide as main, or even major, components.

Processes for cryogenic capture of $CO_2$ which treat gases, originating from hydrogen production units comprising a pressure swing adsorption (PSA) hydrogen separation unit, are sometimes combined with membrane separation. This makes it possible to recover the hydrogen contained in the treated gas and to recycle it to the hydrogen-producing PSA. The residual gas passes through a second membrane separation unit in order to recover the remaining hydrogen and $CO_2$ which are recycled to the compression upstream of the cryogenic separation.

The word "cryogenic" describes herein temperatures below 0° C.

The still pressurized residual gas obtained is expanded and usually serves as regeneration gas for the dryer upstream of the cryogenic separation. This expansion is carried out in a valve, the installation of a turbine connected to a generator possibly proving to be prohibitive when electricity is cheap.

WO12064938, WO12064941 and WO12158673 mention the reheating of the residual gas from the cryogenic separation in a heat exchanger, before it is sent to a first membrane separation unit. The permeate is compressed in a booster compressor. The residue is for its part sent to a second membrane separation unit. Its permeate passes through the heat exchanger before recycling to the machine upstream of the cryogenic separation. The residue also passes through the heat exchanger and is expanded in a turbine.

The invention makes it possible to recover the energy lost during the expansion of the residue from the membrane separation units in the form of compression energy which allows optimization of the membrane separation process. Thus, the process is more energy efficient and/or makes it possible to obtain higher $CO_2$-capture and hydrogen-production yields.

SUMMARY

According to one subject of the invention, what is provided is a process for membrane separation of a mixture containing, as main, or even major, components, hydrogen and carbon dioxide and also at least one other component, for example chosen from the following group: carbon monoxide, methane and nitrogen, said process comprising the following steps:

i) heating of the mixture in a heat exchanger up to a first temperature;

ii) permeation of the mixture reheated to the first temperature, in a first membrane separation unit making it possible to obtain a first permeate which is hydrogen and carbon dioxide enriched relative to the mixture and a first residue which is hydrogen and carbon dioxide lean relative to the mixture;

iii) cooling of at least one portion of the first permeate in the heat exchanger;

iv) permeation of the first residue in a second membrane separation unit making it possible to obtain a second permeate and a second residue which is hydrogen and carbon dioxide lean relative to the second permeate, and v) at at least one portion of the first permeate, cooled in the heat exchanger, is compressed in a booster compressor, the second residue is expanded in a turbine and the booster compressor is driven by the turbine.

According to other optional aspects which can be combined with each other in any manner compatible with logic and science:

at least one portion of the first permeate compressed in the booster compressor is sent to a pressure swing adsorption separation unit in order to extract the hydrogen therefrom;

the at least one portion of the first permeate compressed in the booster compressor is cooled in the heat exchanger (E) before being sent to the adsorption separation unit;

the mixture is reheated in at least one exchanger only by at least one flow produced by the membrane separation or even by the first membrane separation unit;

the heat exchanger has a first end and a second end, the second end being colder than the first and wherein the at least one portion of the first permeate is cooled up to the second end before being sent to the booster compressor;

the inlet temperature of the turbine is substantially equal to the temperature at which the second residue leaves the second membrane separation unit;

the reheated mixture enters the first membrane separation unit at a temperature substantially equal to the temperature at which it leaves the heat exchanger;

a variable portion of the mixture is not reheated in the heat exchanger and mixes with the reheated mixture upstream of the first membrane separation unit;

at least one portion of the permeate from the first membrane separation unit is sent directly to the turbine without passing through the heat exchanger and/or without having cooled it;

at least one variable portion of the permeate from the first membrane separation unit is sent directly to the turbine without passing through the heat exchanger;

only one portion of the first permeate compressed in the booster compressor is sent to the heat exchanger;

the process comprising a separation step operating at a temperature below 0° C. by distillation and/or by partial condensation in order to produce the mixture to be separated and wherein the cold produced by the expansion in the turbine is used in the separation unit operating at a temperature below 0° C. or in a refrigeration cycle;

the process comprising a separation step operating at a temperature below 0° C. by distillation and/or by partial compensation in order to separate a gas compressed in a booster compressor and to produce the mixture to be separated wherein a portion of the second permeate is sent to the gas booster compressor, preferably without having been cooled in the heat exchanger;

the mixture originates from a PSA-type adsorption unit producing a hydrogen-enriched flow and a hydrogen-lean flow;

the hydrogen-lean flow is separated, for example by distillation and/or partial condensation, in order to form the mixture;

at least one portion of the gas boosted in the booster compressor is sent to the PSA-type adsorption unit, preferably substantially at the booster compressor outlet pressure;

there is no machine for compression of the first permeate other than the booster compressor upstream of the adsorption unit;

the second permeate is more hydrogen and/or carbon dioxide rich than the first permeate;

the second residue is less hydrogen and/or carbon dioxide rich than the first residue;

the second permeate is more hydrogen and/or carbon dioxide lean than the first permeate;

the second residue is less hydrogen and/or carbon dioxide lean than the first residue;

at least one portion of the first permeate is at least partially cooled in the heat exchanger before being sent to the booster compressor;

the gas compressed in the compressor is a residual gas from a pressure swing adsorption hydrogen separation unit.

According to another aspect of the invention, what is provided is a device for membrane separation of a mixture containing, as main, or even major, components, hydrogen and carbon dioxide and also at least one other component, for example chosen from the following group: carbon monoxide, methane and nitrogen, said device comprising:

a) a heat exchanger and means for sending the mixture to heat in the heat exchanger to a first temperature;

b) a first membrane separation unit and means for sending the mixture reheated to the first temperature to the first membrane separation unit in order to obtain a first permeate which is hydrogen and carbon dioxide enriched relative to the mixture and a first residue which is hydrogen and carbon dioxide lean relative to the mixture;

c) at least one pipe for sending at least one portion of the first permeate to cool in the heat exchanger;

d) a second membrane separation unit, a pipe for sending the first residue to the second membrane separation unit making it possible to obtain a second permeate and a second residue which is hydrogen and carbon dioxide lean relative to the second permeate, and e) a booster compressor, means connected to the heat exchanger for sending at least one portion of the first permeate, cooled in the heat exchanger, to the booster compressor in order to be compressed, optionally means for sending the compressed first permeate to cool in the heat exchanger, a turbine, means for sending the second residue to expand in the turbine, and the booster compressor is coupled with the turbine in order to be driven by said turbine.

The invention comprises at least one of the following steps:

Reheating the gas to be treated through the heat exchanger.

Passing the reheated gas through a first membrane separation unit, potentially without additional heating after the heating in the heat exchanger, the permeate from which is at a pressure lower than that of the PSA inlet.

Optionally cooling at least one portion of the permeate through the heat exchanger.

Compressing the permeate in one or more booster compressors in order to achieve a pressure sufficient to recycle it upstream of the PSA.

Cooling the gas at the outlet of the booster compressor in the heat exchanger before recycling upstream of the PSA.

Passing the residue from the first membrane separation unit into a second membrane separation unit, the permeate being recycled to the compression upstream of the cryogenic separation (with or without preliminary cooling in the heat exchanger).

Expanding the pressurized and hot residue in one or more turbines which drive(s) the booster compressor.

Several variants can be envisioned:

Absence of additional reheating, the heat for preheating the gas to be treated being entirely provided by the booster compressor. To do this, means for bypassing the heat exchanger may be necessary in order to be able to regulate the temperature and the heat transferred. Care will be taken to ensure that the temperature at the inlet of the booster compressor is sufficiently high by not cooling all of the permeate from the first membrane separation unit before compression thereof. Not all the permeate compressed will necessarily be cooled in the case where the heat introduced is too great.

Expansion in the turbine in order to obtain low temperatures making it possible to produce cold used in the cryogenic separation or in a refrigeration cycle.

Recycling to the booster compressor upstream of the cryogenic separation of the hot second permeate without cooling in the heat exchanger, This arrangement makes it possible to significantly lower the pressure of the first permeate while at the same time still being able to recycle it to the PSA by virtue of the booster compressor. The pressure reduction is of the order of a ratio of at most 2, or even of at most 1.7. As a result, for an equivalent hydrogen and/or $CO_2$ yield, fewer membrane separation units can be used.

However, better still, because of the lower pressure, the pressure ratio across the membrane separation unit is increased, enabling better separation efficiency. Thus, the number of membrane separation units can be kept constant or it is even possible for a moderate number of said units to be added in order to obtain much higher yields, of $CO_2$ in particular. The pressure ratio in the membrane separation unit is between 2.3 and 3.6. In other words, the increase in yield is done at more moderate costs than if it had been necessary to do so with a higher permeate pressure.

The increase in separation efficiency makes it possible to also obtain a better selectivity, thus limiting the energy for recompression of the permeates since the latter have a lower concentration of impurities.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF THE PREFERRED EMBODIMENTS

Figure 1:
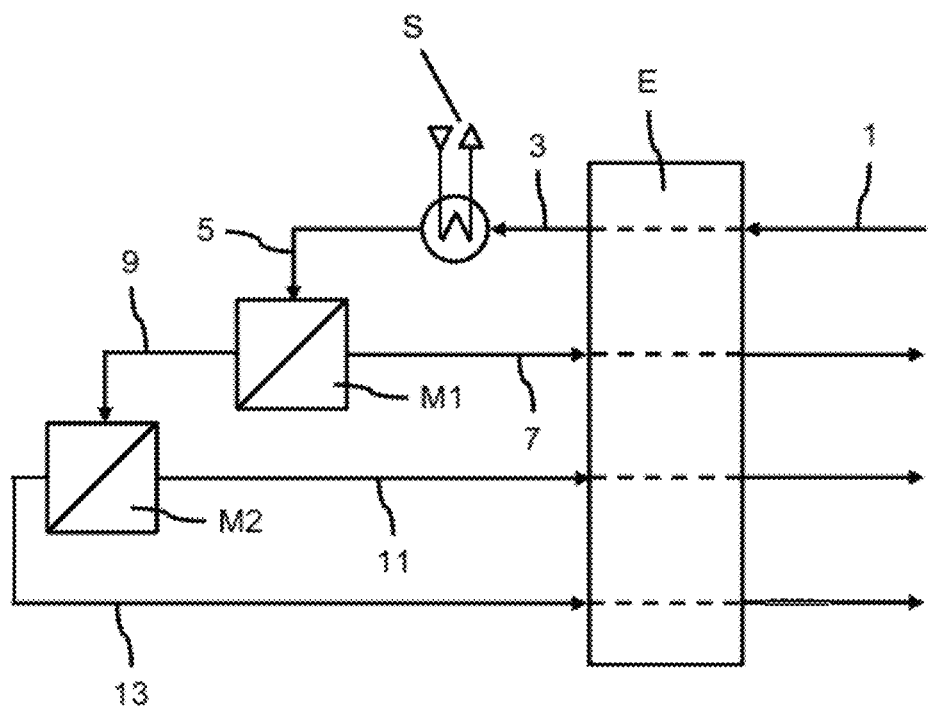
FIG. 1 shows a scheme of a comparative process.

In FIG. 1, a gas mixture 1 containing as main, or even major, components hydrogen and carbon dioxide and also at least one other component, for example chosen from the following group: carbon monoxide, methane and nitrogen, is reheated in a heat exchanger E by indirect heat exchange with three flows separated by the separation process, preferably only with these three flows.

The mixture 1 preferably originates from a PSA-type adsorption unit producing a hydrogen-enriched flow and a flow which is separated in order to form the mixture.

The reheated flow 3 is reheated even more in a reheater heated for example by steam S. The flow 5 reheated by the reheater is sent to separate in a first membrane separation unit M1. This separation produces a first permeate 7 which is hydrogen and carbon dioxide enriched relative to the mixture and lean with respect to the at least one other component relative to the mixture, and a first residue 9 which is hydrogen and carbon dioxide lean relative to the mixture and enriched with respect to the at least one other component relative to the mixture. The first permeate 7 cools in the heat exchanger E in order to be sent to the PSA. The first residue 9 is sent to a second membrane separation unit M2 in order to produce a second permeate 11 which is hydrogen and carbon dioxide enriched and lean with respect to the at least one other component, and a second residue 13 which is hydrogen and carbon dioxide lean and enriched with respect to the at least one other component. The second permeate 11 is in this case more hydrogen and/or carbon dioxide rich than the first permeate 7, and the second residue 13 is less hydrogen and/or carbon dioxide rich than the first residue 9. Or else, the second permeate 11 may be more hydrogen and/or carbon dioxide lean than the first permeate 7, and the second residue 13 is more hydrogen and/or carbon dioxide rich than the first residue 9, The second permeate 11 is more hydrogen and carbon dioxide rich than the second residue 13.

The second permeate 11 cools in the heat exchanger E and is sent to a compressor. This compressor can for example compress a flow intended to be separated by low-temperature separation (distillation and/or partial condensation) in order to produce the gas 1.

The second residue 13 is expanded, and can be used to regenerate a dryer, then it is optionally sent as fuel to a hydrogen production unit, for example upstream of the adsorption unit.

Figure 2:
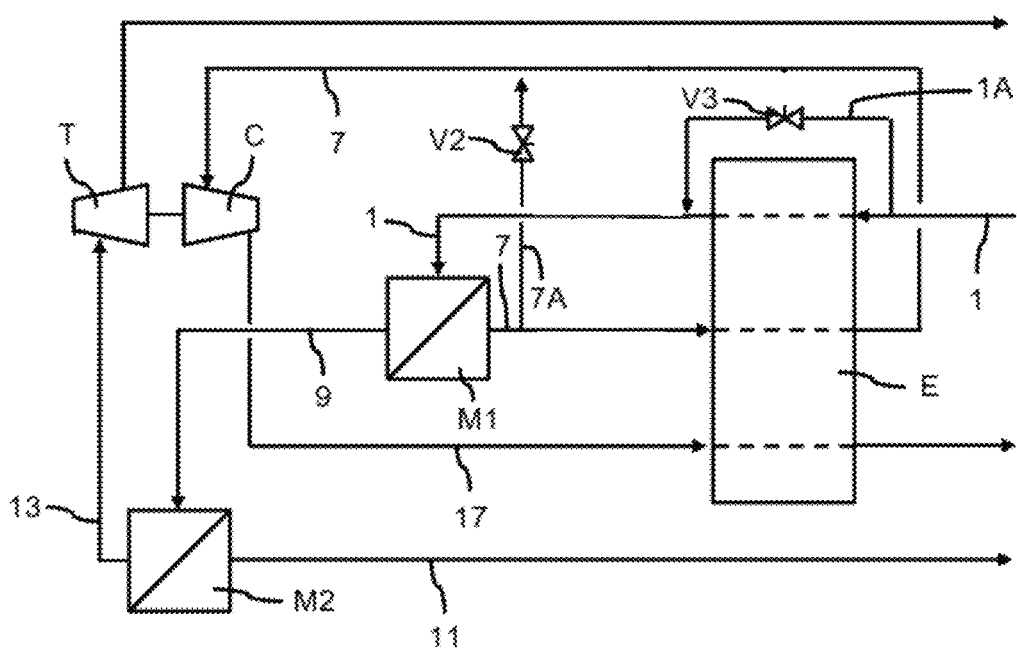
FIG. 2 shows a variant of FIG. 1 according to the invention.

In FIG. 2, a gas mixture 1 containing as main, or even major, components hydrogen and carbon dioxide and also at least one other component, for example chosen from the following group: carbon monoxide, methane and nitrogen, is reheated in a heat exchanger E by indirect heat exchanger with two flows separated by the separation process, preferably only with these two flows.

The mixture 1 preferably originates from a PSA-type adsorption unit producing a hydrogen-enriched flow and a flow which is separated by distillation and/or partial condensation in order to form the mixture 1.

The reheated flow 1 is sent to separate in a first membrane separation unit M1. This separation produces a first permeate 7 which is hydrogen and carbon dioxide enriched and lean with respect to at least one other component, and a first residue 9 which is hydrogen and carbon dioxide lean and enriched with respect to the at least one other component. At least one portion of the first permeate 7 (in this case the entire first permeate) is sent to a booster compressor C. Optionally, at least one portion of the first permeate cools in the heat exchanger E upstream of the booster compressor C. The boosted flow 17 is cooled in the exchanger E.

The first residue 9 is sent to a second membrane separation unit M2 in order to produce a second permeate 11 which is hydrogen and carbon dioxide enriched and lean with respect to the at least one other component, and a second residue 13 which is hydrogen and carbon dioxide lean and enriched with respect to the at least one other component.

The second permeate 11 may be more hydrogen and/or carbon dioxide rich than the first permeate 7, and the second residue 13 may be less hydrogen and/or carbon dioxide rich than the first residue 9. Or else, the second permeate 11 may be more hydrogen and/or carbon dioxide lean than the first permeate 7, and the second residue 13 may be less hydrogen and/or carbon dioxide lean than the first residue 9.

The second permeate 11 is more hydrogen and carbon dioxide rich than the second residue 13.

The second permeate 11 is sent to a compressor of a flow from which the gas 1 is derived by low-temperature separation (distillation and/or partial condensation).

The second residue 13 is sent to a turbine T coupled to the booster compressor C. The flow expanded in the turbine is not cooled here in the exchanger E.

The second residue 13 expanded in the turbine can be used to regenerate a dryer and/or sent as fuel to a hydrogen production unit, for example a reformer, for example upstream of the adsorption unit.

The absence of any reheater between the hot end of the exchanger E and the inlet of the separation unit M1 is noted.

Such a reheater can however be present.

There is a bypassing pipe 1A which makes it possible to send a portion of the flow 1 from the cold end to the hot end of the exchanger E without passing through the heat exchanger E and thus to arrive at the unit 1 without having been reheated.

This pipe 1A is fitted with a valve V3 regulated by the inlet temperature of the gas 1 in the unit M1.

There is also a bypassing pipe 7A between the permeate 7 outlet of the unit M1 and the inlet of the booster compressor C, this pipe being fitted with a valve V2 regulated by the outlet temperature of the booster compressor C and by the inlet temperature of the gas 1 in the unit.

It is possible to send only one portion of the first permeate compressed in the booster compressor C to the heat exchanger E.

At least one portion 17 of the first permeate compressed in the booster compressor C can be sent to a pressure swing adsorption unit in order to be separated and to extract the hydrogen therefrom, preferably at substantially the outlet pressure of the booster compressor C.

The device can comprise, upstream of the membrane separation portion, a separation unit operating at a temperature below 0° C. by distillation and/or by partial condensation in order to produce the mixture to be separated in the membrane separation portion. In this case, the cold produced by the expansion in the turbine T can be used in the separation unit operating at a temperature below 0° C. or in a refrigeration cycle.

A portion of the second permeate 11 can be sent to the compressor of the low-temperature separation unit.

In the two examples, the heat exchanger E can be divided into a plurality of heat exchangers.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for membrane separation of a mixture containing hydrogen and carbon dioxide and also at least one other component chosen from the following group: carbon monoxide, methane and nitrogen, said process comprising:
   i) heating of the mixture in a heat exchanger up to a first temperature;
   ii) separating the mixture reheated to the first temperature, in a first membrane separation unit thereby obtaining a first permeate which is hydrogen and carbon dioxide enriched relative to the mixture and a first residue which is hydrogen and carbon dioxide lean relative to the mixture;
   iii) cooling of at least one portion of the first permeate in the heat exchanger; thereby producing a cooled first permeate stream,
   iv) separating the first residue in a second membrane separation unit thereby obtaining a second permeate and a second residue which is hydrogen and carbon dioxide lean relative to the second permeate, and
   v) compressing the cooled first permeate stream in a booster compressor, expanding the second residue in a turbine and the booster compressor is driven by the turbine.

2. The process as claimed in claim 1, wherein at least one portion of the first permeate compressed in the booster compressor is sent to a pressure swing adsorption separation unit in order to extract the hydrogen therefrom.

3. The process as claimed in claim 2, wherein the at least one portion of the first permeate compressed in the booster compressor is cooled in the heat exchanger before being sent to the adsorption separation unit.

4. The process as claimed in claim 1, wherein the heat exchanger has a first end and a second end, the second end being colder than the first and wherein the at least one portion of the first permeate is cooled up to the second end before being sent to the booster compressor.

5. The process as claimed in claim 1, wherein the inlet temperature of the turbine is substantially equal to the temperature at which the second residue leaves the second membrane separation unit.

6. The process as claimed in claim 1, wherein the reheated mixture enters the first membrane separation unit at a temperature substantially equal to the temperature at which it leaves the heat exchanger.

7. The process as claimed in claim 1, wherein a variable portion of the mixture is not reheated in the heat exchanger and mixes with the reheated mixture upstream of the first membrane separation unit.

8. The process as claimed in claim 7, wherein at least one variable portion of the first permeate from the first membrane separation unit is sent directly to the booster compressor without passing through the heat exchanger.

9. The process as claimed in claim 6, wherein only one portion of the first permeate compressed in the booster compressor is sent to the heat exchanger.

10. The process as claimed in claim 1, comprising a separation step operating at a temperature below 0° C. by distillation and/or by partial condensation in order to separate a gas compressed in a compressor and to produce the mixture to be separated.

11. The process as claimed in claim 10, wherein at least one portion of the second permeate is sent to the gas compressor.

12. The process as claimed in claim 10, wherein the gas compressed in the compressor is a residual gas from a pressure swing adsorption hydrogen separation unit.

* * * * *